June 16, 1925.
F. C. DRAKE ET AL
1,542,676
BATTERY CASE
Filed April 26, 1923
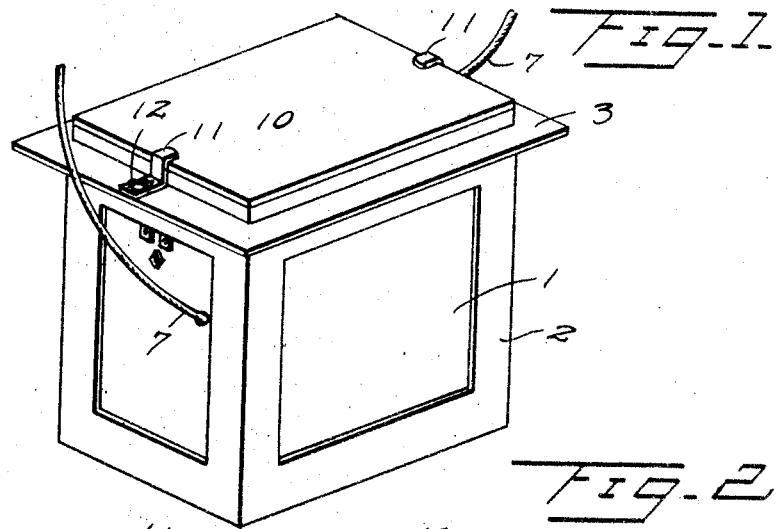
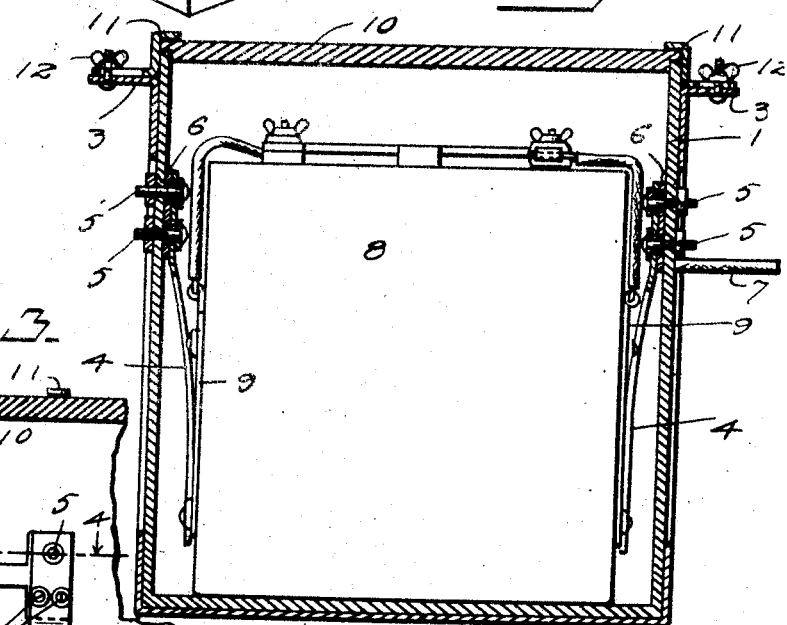
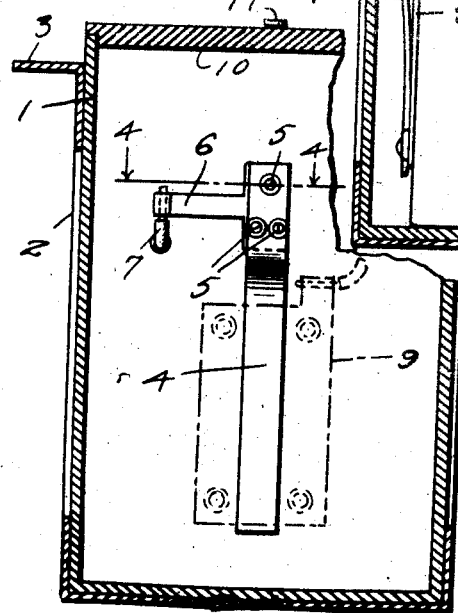
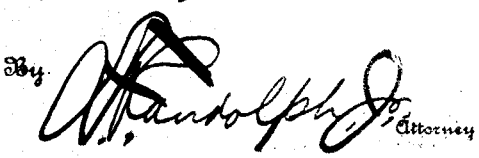
Inventors
F.C.Drake  J.W.Hough
H.J.Iddings  L.D.Pierson,
By
Attorney Patented June 16, 1925.

1,542,676

UNITED STATES PATENT OFFICE.

FREDERICK C. DRAKE, JOHN W. HOUGH, HARRY J. IDDINGS, AND LEROY D. PIERSON, OF MAPLETON, IOWA.

BATTERY CASE.

Application filed April 26, 1923. Serial No. 634,849.

*To all whom it may concern:*

Be it known that we, FREDERICK C. DRAKE, JOHN W. HOUGH, HARRY J. IDDINGS, and LEROY D. PIERSON, citizens of the United States, residing at Mapleton, in the county of Monona and State of Iowa, have invented certain new and useful Improvements in Battery Cases; and we do hereby declare the following to be a full, clear, and exact description of the invention, such as will enable others skilled in the art to which it appertains to make and use the same.

The invention has for its object to provide protective means for the storage battery of a motor vehicle such as generally used for ignition and lighting purposes.

A further purpose of the invention is the provision of a case to which the lead wire may be permanently connected, the battery being readily removable from and insertible within the case without requiring the loosening or coupling of wires, the connections being such as to automatically couple or uncouple the terminals of the battery with the lead wires, it being necessary only to lift the battery from the case and to drop the same therein.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application:

Figure 1 is a perspective view of a battery case embodying the invention,

Figure 2 is a vertical longitudinal section thereof with the battery in position therein, Figure 3 is a view of the inner side of a portion of the case showing a battery connection, and Figure 4 is a detail sectional view on the line 4—4 of Figure 3.

Corresponding and like parts are referred to in the following description and designated in the several views of the drawings by like reference characters.

The numeral 1 designates the body of the case which may be constructed of any suitable material and in any preferred way. The case 1 is strengthened and reinforced by means of an external frame 2, preferably constructed of angle iron, said frame being of skeleton formation and embracing the corners between adjacent sides and between the sides and the bottom, the upper angle number being disposed with a flange projecting outwardly, as indicated at 3, whereby to provide supporting means for the case and the fastening means whereby the cover of the case is held in place.

A spring connector 4 is located upon the inner side of each end wall of the case and is connected at one end to the latter by bolts 5 or other suitable fastening means which are electrically insulated from the connector 4 to prevent short circuiting of the battery from without the case. An arm 6 projects laterally from the end of the connector 4 that is fastened to the case and a lead wire 7 is electrically connected to the arm 6 and extends to the parts to be supplied with current from the battery.

The numeral 8 designates a storage battery such as generally provided for an internal combustion engine constituting the motor plant of an automobile, motor boat, flying machine and the like. A plate 9 is attached to the outer side of each end of the battery and is connected with a battery terminal. The plates 9 are so positioned as to come opposite the spring connectors 4 when the battery is in position within the case 1, thereby completing the circuit through said connectors and the lead wires 7 to the part or parts to be supplied with current from the battery. The construction is such as to admit of the battery 8 being readily lifted from the case and replaced therein without loosening any parts or disconnecting or coupling any wires and the spring connectors insure a positive closing of the circuit and the maintaining of the same in closed relation. A cover 10 closes the top of the case 1 and is held in place by means of turnbuttons 11 or other suitable fastening means applied to the outer flange 3. The turnbutton 11 may be tightened or loosened by means of thumb screws 12.

What is claimed is:

In combination, a case having connectors therein of resilient material fastened at opposite side walls thereof, a battery supported by and within the case, said battery at two sides having plates, conductors disposed completely exteriorly of the battery, said conductors connecting the plates to terminals of the battery, laterally extending terminal arms on the connectors, said arms and the connections of the conductors to the plates being on opposite sides of the zones of contact of the connectors and plates.

In testimony whereof we affix our signatures in presence of two witnesses.

FREDERICK C. DRAKE.
JOHN W. HOUGH.
HARRY J. IDDINGS.
LEROY D. PIERSON.

Witnesses:
RICHARD PORTER,
G. G. HARRIS.